United States Patent
Yang et al.

(10) Patent No.: US 9,148,361 B2
(45) Date of Patent: Sep. 29, 2015

(54) METHOD AND APPARATUS FOR ROUTES SEPARATION IN ASON SERVICES

(75) Inventors: Hui Yang, Guangdong Province (CN); Baojian Qiu, Guangdong Province (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 862 days.

(21) Appl. No.: 13/384,897

(22) PCT Filed: Jul. 6, 2010

(86) PCT No.: PCT/CN2010/075018
§ 371 (c)(1),
(2), (4) Date: Jan. 19, 2012

(87) PCT Pub. No.: WO2011/009376
PCT Pub. Date: Jan. 27, 2011

(65) Prior Publication Data
US 2012/0189305 A1    Jul. 26, 2012

(30) Foreign Application Priority Data
Jul. 20, 2009 (CN) .......................... 2009 1 0161630

(51) Int. Cl.
*H04J 14/00* (2006.01)
*H04L 12/735* (2013.01)
(Continued)

(52) U.S. Cl.
CPC ............ *H04L 45/128* (2013.01); *H04L 47/726* (2013.01); *H04Q 11/0062* (2013.01); *H04L 45/306* (2013.01); *H04L 45/62* (2013.01); *H04Q 2011/0073* (2013.01)

(58) Field of Classification Search
CPC .............. H04J 14/0227; H04J 14/0267; H04J 14/0268; H04J 14/0269; H04J 14/0271; H04J 45/04; H04J 45/22; H04J 45/28; H04Q 11/0062; H04Q 11/0066; H04Q 11/0067
USPC ........... 398/45, 48, 49, 46, 47, 50, 54, 51, 56, 398/57, 58, 79; 370/235, 225, 238, 254, 370/389, 392, 401, 352, 351, 228
See application file for complete search history.

(56) References Cited

U.S. PATENT DOCUMENTS

2007/0121507 A1* 5/2007 Manzalini et al. ............ 370/235
2008/0170856 A1* 7/2008 Shi et al. ......................... 398/50

FOREIGN PATENT DOCUMENTS

CN          1780190 A     5/2006
CN          1859170 A     11/2006
(Continued)

OTHER PUBLICATIONS

International Search Report dated Oct. 21, 2010 issued in International Application No. PCT/CN2010/075018, previously submitted on Jan. 19, 2012.
(Continued)

*Primary Examiner* — Hanh Phan
(74) *Attorney, Agent, or Firm* — Scully, Scott, Murphy & Presser, P.C.

(57) ABSTRACT

The present invention discloses a method and an apparatus for routes separation in ASON services, wherein the method comprises: calculating a route between each of different calls or each of different services of a same call in an automatic switched optical network (ASON); wherein if there are enough network resources, then set the routes of the respective services to be independent from each other; and if there are not enough resources, then set the routes of the respective services to be partially overlapped or completely overlapped. According to the technical solution provided by the present invention, the problem in relevant art that the routes carrying each of the services cannot be sufficiently separated or the network resources cannot be sufficiently used is solved, thus not only multiple services using the same path can be avoided but also the situation that routes cannot be found while there are enough resources can be avoided.

9 Claims, 5 Drawing Sheets

(51) Int. Cl.
  H04L 12/911 (2013.01)
  H04Q 11/00 (2006.01)
  H04L 12/725 (2013.01)
  H04L 12/721 (2013.01)

(56) References Cited

FOREIGN PATENT DOCUMENTS

| CN | 101192961 A | 6/2008 |
| CN | 100454837 C | 1/2009 |
| CN | 101454837 A | 6/2009 |
| EP | 1 662 717 A1 | 5/2006 |
| JP | 2006060337 A | 3/2006 |

OTHER PUBLICATIONS

Lee, S. et al., "Split Multipath Routing with Maximally Disjoint Paths in Ad hoc Networks" Communications 10:3201-3205 (2001).

\* cited by examiner

METHOD AND APPARATUS FOR ROUTES SEPARATION IN ASON SERVICES

FIELD OF THE INVENTION

The present invention relates to the communication technology field, and in particular to a method and an apparatus for routes separation in automatic switched optical network (abbreviated as ASON) services in the communication field.

BACKGROUND OF THE INVENTION

The automatic switched optical network (abbreviated as ASON) is a new generation network which can complete the automatic switch function under the control of route selections and signalings. The appearance of the ASON provides automation control and management means for large capacity traffic. The ASON network has the characteristic of being able to be used as a carrier network, and when the ASON is used as a carrier network, it can provide reliable delivery service for service networks such as IP, 3G, soft switch, etc.; and when the ASON is used as a service network, it can directly provide services such as high quality Ethernet private line (abbreviated as EPL), bandwidth distributed according to demands, optical virtual private network, etc.

The ASON introduces an independent control plane on the basis of the original management plane and delivery plane of the conventional SDH network. The main functions of the management plane are establishing, confirming and monitoring paths and coordinating the function implementations of the control plane and delivery plane, comprising functions such as fault management, configuration management (resource allocation and release), performance management, security management, charging management, etc.; the control plane is consist of a group of communication entities which are supported by the signaling network and capable of realizing the functions such as establishment, release, monitoring, maintenance of connections and etc.; and the delivery plane comprises a delivery network element used for implementing a cross function and provides functions of payload delivery, performance monitoring, fault detection and protection switching.

In the relevant art, when the ASON control plane establishes multiple calls or establishes multiple services under the same call, the routes between each of the calls or between different services under the same call either are not separated or completely separated. However, the users always hope that the routes carrying different calls or different services under the same call are separated maximally while the network resources also are sufficiently used. And not only multiple services using the same path is avoided but also the situation that routes cannot be found while there are enough resources can be avoided. The routes separation solution in relevant art still cannot meet the above user demands.

SUMMARY OF THE INVENTION

The present invention is proposed regarding the problem in relevant art that when the ASON control plane establishes multiple services, the routes carrying the services are either not separated or completely separated, which causes that the routes carrying the services cannot be sufficiently separated or the network resources cannot be sufficiently used. Therefore, the present invention provides an improved method and an improved apparatus for routes separation in the ASON services so as to solve at least one of the above problems.

A method for routes separation in ASON services is provided according to one aspect of the present invention.

The method for routes separation in ASON services according to the present invention comprises: calculating a route for each of different calls or each of different services of a same call in an automatic switched optical network (ASON); wherein if there are enough network resources, then set the routes of the respective services to be independent from each other; and if there are not enough resources, then set the routes of the respective services to be partially overlapped or completely overlapped.

An apparatus for routes separation in ASON services is provided according to another aspect of the present invention.

The apparatus for routes separation in ASON services comprises: a route calculating unit, wherein the route calculating unit is configured to calculate a route for each of different calls or each of different services of a same call in an automatic switched optical network, wherein if there are enough network resources, then set the routes of the respective services to be independent from each other; and if there are not enough resources, then set the routes of the respective services is to be partially overlapped or completely overlapped.

By virtue of the present invention, a solution for separating routes for the ASON services is provided, and a route is calculated for each service in the ASON; wherein if there are enough network resources, then the routes of each of the services is set to be independent from each other; and if there are not enough resources, then the routes of each of the services is set to be partially overlapped or completely overlapped. The problem in relevant art that the routes carrying each service cannot be sufficiently separated or the network resources cannot be sufficiently used is solved, thus not only multiple services using the same path can be avoided but also the situation that routes cannot be found while there are enough resources can be avoided.

Other features and advantages of the present invention will be described in the following description and partly become obvious from the description, or be understood by implementing the present invention. The objects and other advantages of the present invention can be realized and obtained through the structures specially indicated by the description, claims, and drawings.

BRIEF DESCRIPTION OF THE DRAWINGS

The drawings herein are used to provide a further understanding of the present invention and form a part of the description, which are used to explain the present invention together with the embodiments of the present invention without unduly limiting the scope of the present invention. In the drawings.

DETAILED DESCRIPTION OF EMBODIMENTS

Regarding the problem in relevant art that when the ASON control plane establishes multiple services, the routes carrying the services are either not separated or completely separated, which causes that the routes carrying the services cannot be sufficiently separated or the network resources cannot be sufficiently used, the present invention proposes a strategy for separating the routes carrying multiple calls or different services under the same call as much as possible. In this case, the above multiple calls or different services under the same call refer to calls and services with the same upstream/downstream service nodes, and therefore, the routes separation among the respective calls or among the respective services under the same call is embodied as the separation of passed route resources of the nodes other than the head and tail nodes (intermediate nodes) of respective services, which comprises three types of separation: link resources separation, node resources separation and shared risk link group (abbreviated as SRLG) resources separation. Under the premise that a user has no designated restraint routes, the ASON control plane can use the routes separation strategy proposed by the present invention for different calls or different services under the same call according to user demands.

By virtue of the embodiments of the present invention, under the condition that there are enough network resources, the routes of the respective calls or of the respective services under the same call are completely separated, wherein the network resources occupied by the separated respective services are completely not overlapped; and when there are not enough network resources, the routes of the respective calls or the respective services under the same call are separated as much as possible, wherein the network resources occupied by the separated receptive services are partially overlapped or are completely not overlapped. By virtue of the above technical solution provided by the present invention, on one hand, the risk of multiple services using the same path can be reduced; and on the other hand, the existing network resources can be maximally used by using the resources minimum overlap strategy to perform routes separation.

The embodiments of the present invention and the features in the embodiments can be combined with each other if there is no conflict.

The preferred embodiments of the invention will be described in conjunction with the accompanying drawings hereinafter, and it should be understood that the preferred embodiments described here are only for the purpose of illustration, not for limiting the present invention.

Method Embodiments

A routes separation method for ASON services is first provided according to an embodiment of the present invention.

Figure 1:
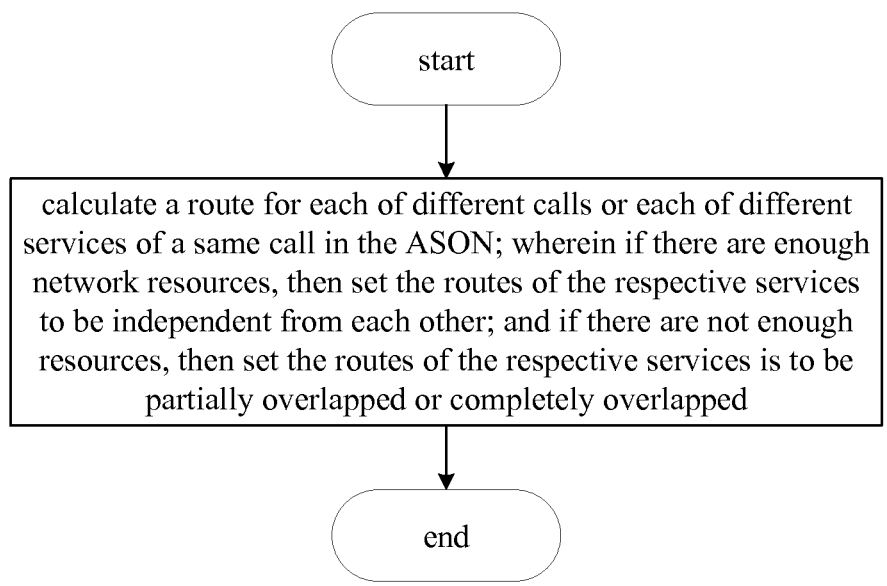
FIG. 1 is a flowchart of a routes separation method for ASON services according to an embodiment of the present invention.

FIG. 1 is a flowchart of a routes separation method for ASON services routes according to an embodiment of the present invention. As shown in FIG. 1, the routes separation method for ASON services according to the embodiment of the present invention comprises the following processes: calculating a route for each of different calls or each of different services of the same call in an automatic switched optical network (ASON).

In the above, if there are enough network resources, then set the routes of the respective services to be independent from each other; and if there are not enough resources, then set the routes of the respective services to be partially overlapped or completely overlapped.

Preferably, under the condition that network resources are relatively sufficient, the routes among the respective calls or among the respective services under the same call are separated using the complete separation strategy, and the network resources occupied by the separated respective services are completely not overlapped.

Preferably, the above network resources comprise but are not limited to the following resources: node resources, link resources, and shared risk link group resources.

Preferably, the above setting the routes of the respective services to be independent from each other can be realized by the following processing: completely separating the routes carrying the respective services according to a strategy of links separation, nodes separation and shared risk link groups separation, in which the links separation refers to setting any two routes carrying services in the ASON not to comprise same links, the nodes separation refers to setting any two routes carrying services in the ASON not to comprise same intermediate nodes, and the shared risk link groups separation refers to setting any two routes carrying services in the ASON not to comprise links belonging to the same shared risk link group. The complete separation of ASON service routes can be completed in combination with the above three.

Preferably, after the separation, the network resources (i.e. node resources, link resources, and shared risk link group resources) occupied by the respective services are completely not overlapped.

Preferably, under the condition that network resources are relatively insufficient, the routes among the respective calls or among the respective services under the same call are separated using the minimum overlap strategy, and the network resources occupied by the separated respective services are partially overlapped or completely overlapped.

Preferably, the above setting the routes of the respective services to be partially overlapped or completely overlapped can be realized by the following processing:

Step (1): perform separation according to a strategy of links separation, nodes separation and shared risk link groups non-separation, and judge whether the routes carrying respective services can be determined. If not, then perform step (2).

Preferably, links separation refers to setting any two routes carrying services in the ASON not to comprise same links, nodes separation refers to setting any two routes carrying services in the ASON not to comprise same intermediate nodes, and shared risk link groups non-separation refers to setting any two routes carrying services in the ASON to comprise links belonging to the same shared risk link group. For example, a path 1 carrying service 1 is established in the ASON, which path 1 comprises a link belonging to a shared risk link group 3, and a path 2 carrying service 2 is established in the above ASON, which path 2 also comprises a link belonging to the shared risk link group 3. Then the two paths comprise links belonging to the same shared risk link group. It can be obtained that the paths 1 and 2 have performed routes separation according to the shared risk link groups non-separation strategy.

In the above, if the route carrying the service cannot be established by step (1) in the network, then establish the route according to step (2).

Step (2): perform separation according to a strategy of links separation, nodes non-separation and shared risk link groups non-separation, and judge whether the routes carrying respective services can be determined. If not, then perform step (3).

In the above, if the route carrying the service cannot be established by step (2) in the network, then establish the route according to step (3).

Step (3): perform separation according to a strategy of links non-separation, nodes non-separation and shared risk link groups non-separation, and judge whether the routes carrying respective services can be determined. If not, then a route carrying the service cannot be established in the ASON.

In the above, after having calculated the route carrying the service by step (3), the network resources (i.e. node resources, link resources, and shared risk link groups resources) occupied by the respective services are completely overlapped.

Preferably, if the route carrying the current service still cannot be determined by step (3), then it indicates that the network resources (route resources) have been used up and a route to carry the current service cannot be found.

Preferably, when performing routes separation, the nodes separation, the links separation and the shared risk link groups separation can be sorted by priority levels according to user demands, then be combined into a network resources minimum overlap strategy. The routes separation can be performed according to this strategy.

In the above, the order of the priority levels can be set by the user himself. For example, the nodes separation is first considered, then the links separation, and last the SRLG separation. Thus, the above network resources minimum overlap strategy can be set.

Firstly, perform separation according to the strategy of links separation, nodes separation and shared risk link groups non-separation. If the route of the current service cannot be determined, then perform separation according to the strategy of nodes separation, links non-separation and shared risk link groups non-separation. If a route of the current service still cannot be determined, then finally perform separation according to the strategy of links non-separation, nodes non-separation and shared risk link groups non-separation. And if a route of the current service still cannot be determined, the establishment of the present call is failed.

Figure 2:
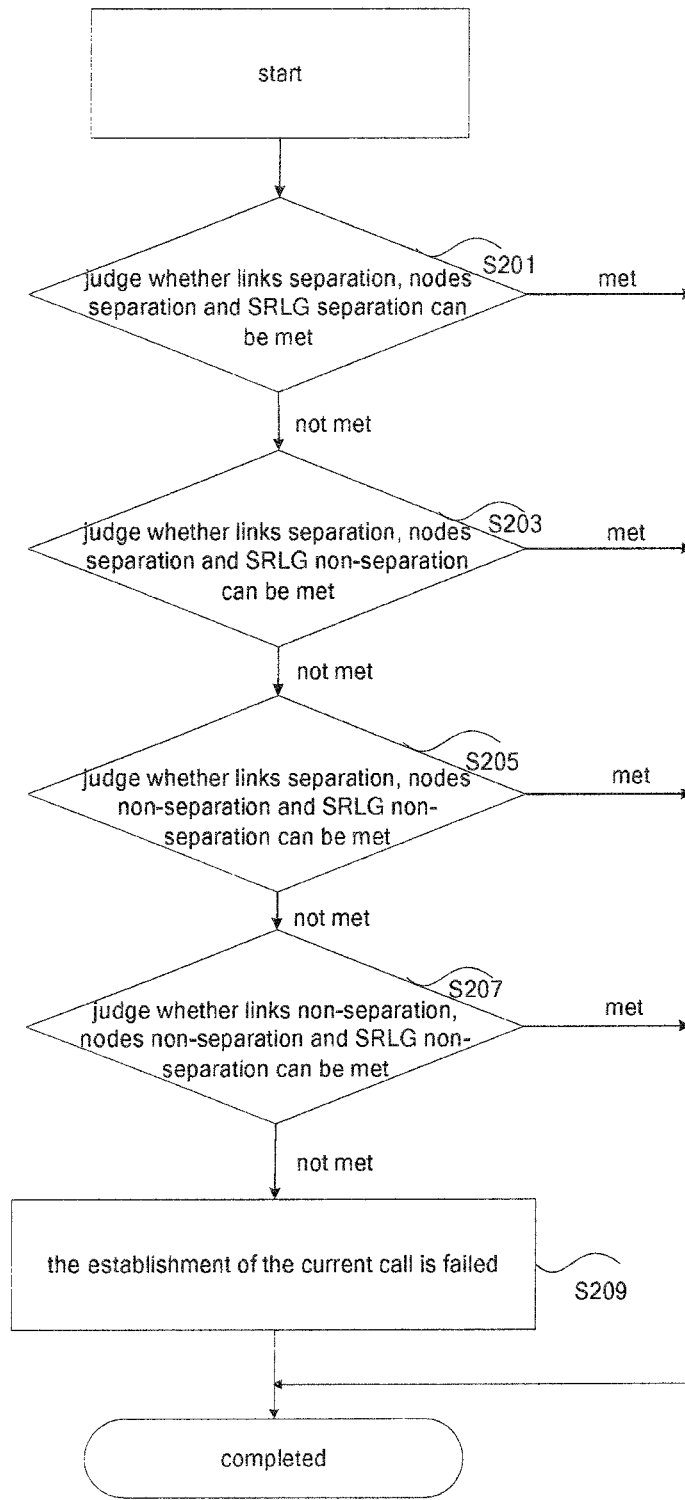
FIG. 2 is a flowchart of a routes separation method for ASON services according to a preferred embodiment of the present invention.

FIG. 2 is a flowchart of a routes separation method for ASON services according to a preferred embodiment of the present invention. As shown in FIG. 2, the routes separation method for ASON service routes according to the preferred embodiment of the present invention comprises the following processing (steps S201 to S209).

Step S201: use the complete separation strategy to select a path which is completely separated from the paths established previously for carrying respective services under all the calls, i.e. selecting a completely idle path in the network to carry the current service. At this moment, the links separation, the nodes separation, and the SRLG separation are met. If a route for carrying the current service cannot be determined, then perform step S203.

Step S203: use the links separation and the nodes separation to select a path whose links and nodes are different from those of the previously established calls. At this moment, the links separation and the nodes separation are met, but SRLG are not separated. If the route for carrying the current service cannot be found, then perform step S205.

Step S205: use the links separation, select a path whose links are different from that of the previously established calls, and at this moment, the links separation is met, but nodes are not separated and SRLG are not separated. If a route for carrying the current service cannot be found, then perform step S207.

Step S207: select a path as the same as that of the previously established calls to carry the current service. At this moment, links are not separated, nodes are not separated and SRLG are not separated. If a route for carrying the current service still cannot be found, then perform step S209.

Step S209: the route resources in the network have been used up, and the establishment of the current call is failed.

A routes separation method for ASON services is provided by the embodiment of the present invention. By virtue of the method, the network resources can be sufficiently used while the routes carrying different calls or different services under the same call can be separated maximally. Moreover, the users can adjust the priority levels of the separation of nodes, links and SRLG according to practical needs, which improves user experience.

Apparatus Embodiments

A routes separation apparatus for ASON services is further provided according to an embodiment of the present invention.

Figure 3:
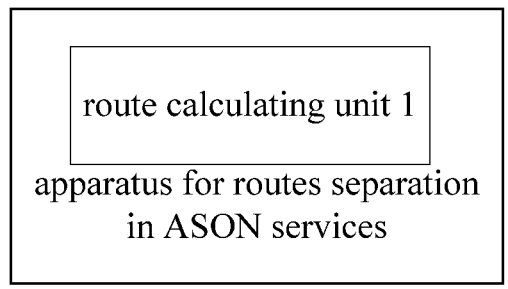
FIG. 3 is a structural block diagram of a routes separation apparatus for ASON services according to an embodiment of the present invention.
Figure 4:
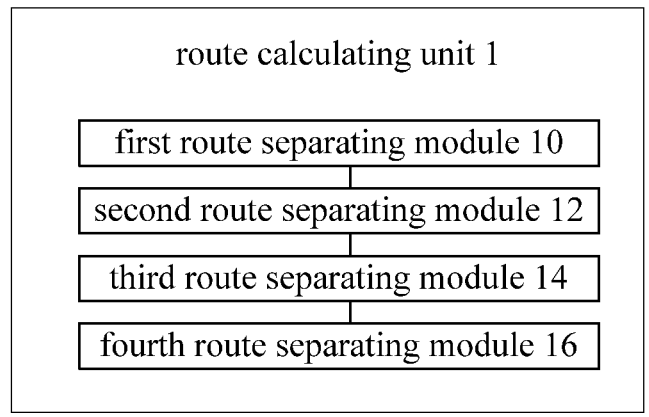
FIG. 4 is a structural block diagram of a routes separation apparatus for ASON services according to a preferred embodiment of the present invention.

FIG. 3 is a structural block diagram of a routes separation apparatus for ASON services according to an embodiment of the present invention. FIG. 4 is a structural block diagram of a routes separation apparatus for ASON services according to a preferred embodiment of the present invention. As shown in FIG. 3, the routes separation apparatus for ASON services according to the embodiment of the present invention comprises: a route calculating unit 1, which will be described in conjunction with FIG. 4 hereinafter.

The route calculating unit 1 is configured to calculate a route for each of different calls or each of different services of the same call in an automatic switched optical network (ASON), wherein if there are enough network resources, then set the routes of the respective services to be independent from each other; and if there are not enough resources, then set the routes of each of the services to be partially overlapped or completely overlapped.

Preferably, as shown in FIG. 4, the route calculating unit 1 comprises: a first route separating module 10, a second route separating module 12, a third route separating module 14, and a fourth route separating module 16, wherein the first route separating module 10 is configured to determine a route carrying each service according to a strategy of links separation, nodes separation and shared risk link groups separation; the second route separating module 12 is configured to determine a route carrying each service according to a strategy of links separation, nodes separation and shared risk link groups non-separation; the third route separating module 14 is configured to determine a route carrying each service according to a strategy of links separation, nodes non-separation and shared risk link groups non-separation; and the fourth route separating module 16 is configured to determine a route carrying each service according to a strategy of links non-separation, nodes non-separation and shared risk link groups non-separation.

Preferably, the route calculating unit 1 performs the links separation by setting any two routes carrying services in the ASON not to comprise same links; performs the nodes separation by setting any two routes carrying services in the ASON not to comprise same intermediate nodes; and performs shared risk link groups separation by setting any two routes carrying services in the ASON not to comprise links belonging to the same shared risk link group.

In the above, the route calculating unit 1 establishes multiple service routes and sufficiently uses the network resources under the premise that the routes of the respective services are ensured to be separated from each other as much as possible.

A routes separation apparatus for ASON services is provided by the embodiment of the present invention. The route calculating unit 1 can be used to establish routes of multiple services. During the establishment of the routes, the risk of multiple services using the same path is reduced, which not only meets the resources minimum overlap strategy but also can maximally use the network resources.

Example I

Figure 5:
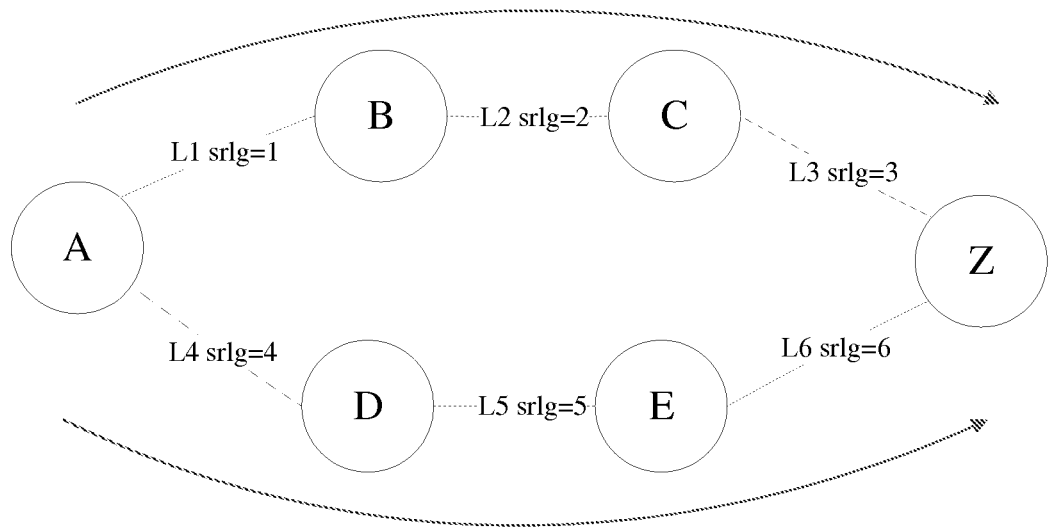
FIG. 5 is a schematic diagram of networking according to the embodiment I of the present invention.

FIG. 5 is a schematic diagram of networking according to the embodiment I of the present invention. As shown in FIG. 5, two calls from A to Z need to be established. The complete separation strategy is first considered to establish bearer routes of the two calls, which mainly comprises the following processing.

Step (1): establish the first call using the complete separation strategy. At this moment there are two reachable paths in the network, and the first call can use one of the two paths. Assume that the first call uses path L1→L2→L3 and passes through nodes A, B, C, and Z.

Step (2): establish the second call which is completely separated from the first call using the complete separation strategy and bypassing links L1, L2, and L3 and nodes B and C passed by the first call. Thus path L4→L5→L6 is selected and nodes A, D, E and Z are passed through.

By then, the bearer routes of the two calls can be established according to the network resources complete separation strategy, and the procedure is ended. Wherein, the route of the second call is completely separated from that of the first call.

Example II

Figure 6:
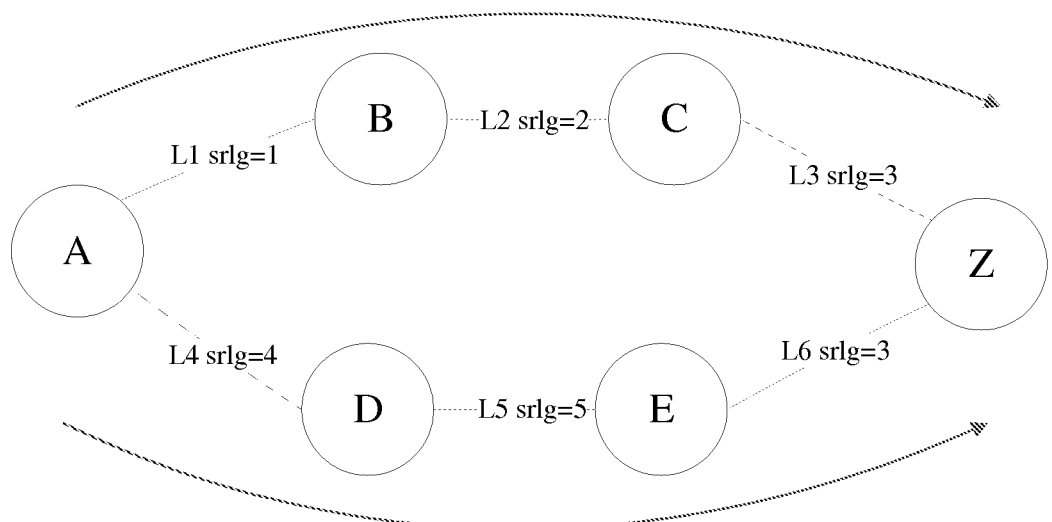
FIG. 6 is a schematic diagram of networking according to the embodiment II of the present invention.

FIG. 6 is a schematic diagram of networking according to the embodiment II of the present invention. As shown in FIGS. 6, L3 and L6 belong to a shared risk link group (srlg=3 is shown in the figure), and two calls from A to Z need to be established. Bearer routes of the two calls are established according to the separation strategy, which mainly comprises the following processing.

Step (1): establish the first call using the complete separation strategy. At this moment there are two reachable paths in the network, and the first call can use one of the two paths. Assume that the first call uses path L1→L2→L3 and passes through nodes A, B, C, and Z.

Step (2): establish the second call, which comprises the following steps.

Step A: it is first considered to completely separate the path of the second call from that of the first call by adopting the complete separation strategy, bypassing links L1, L2, L3 and nodes B and C, and at the same time bypassing SRLG L3 and L6. And if no SRLG resource meeting the condition is found, then the complete separation strategy is failed and step B is continued.

Step B: perform separation by using the minimum overlap strategy, bypassing links L1, L2, L3 and nodes B and C passed by the first call, and not bypassing SRLG. And paths L4, L5, and L6 meeting the condition are found. The establishment of the second call succeeds; the service route uses L4→L5→L6 and passes through A, D, E and Z.

By then, the establishment of two calls succeeds, and the procedure is ended. The second call and the first call pass through the same SRLG, and other link and node resources thereof are not overlapped.

Example III

Figure 7:
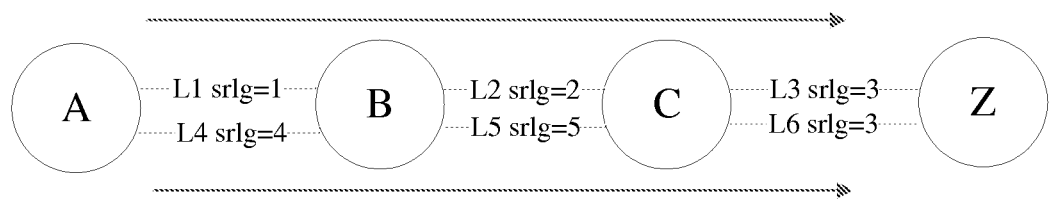
FIG. 7 is a schematic diagram of networking according to the embodiment III of the present invention.

FIG. 7 is a schematic diagram of networking according to the embodiment III of the present invention. As shown in FIG. 7, L3 and L6 belong to a shared risk link group (srlg=3 is shown in the figure), and two calls from A to Z are established. Bearer routes of the two calls are established according to the separation strategy, which mainly comprises the following processing.

Step (1): establish the first call using the complete separation strategy. At this moment there are two reachable paths in the network, and the first call can use one of the two paths. Assume that the first call uses path L1→L2→L3 and passes through nodes A, B, C, and Z respectively.

Step (2): establish the second call, which comprises the following steps.

Step A: it is first considered to completely separate the path of the second call from that of the first call by adopting the complete separation strategy, bypassing links L1, L2, L3 and nodes B and C, and at the same time bypassing SRLG L3 and L6. And if no SRLG resource and node meeting the condition are found, then the complete separation strategy is failed and step B is continued.

Step B: use the strategy of separating links and nodes as much as possible, bypassing links L1, L2, L3 and nodes B and C passed by the first call, and not bypassing SRLG L6. And if still no node resource meeting the condition is found, the strategy of separating links and nodes as much as possible is not met, and then step C is continued.

Step C: use the strategy of separating links as much as possible, bypassing links L1, L2, L3, but not bypassing nodes B, C and SRLG L6. Paths L4, L5, and L6 meeting the condition are found. The establishment of the second call succeeds. The call route uses L4→L5→L6 and passes through nodes A, B, C and Z.

By then, the establishment of two calls succeeds, and the procedure is ended. The second call and the first call pass through the same nodes and SRLG, but the link resources are not overlapped.

Example IV

Figure 8:
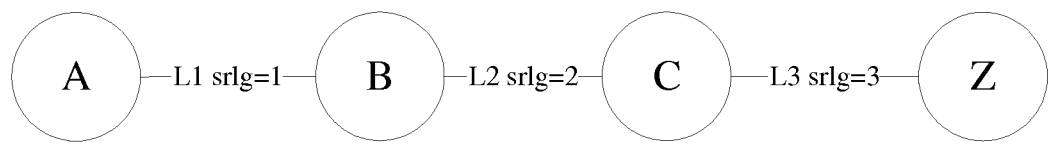
FIG. 8 is a schematic diagram of networking according to the embodiment IV of the present invention.

FIG. 8 is a schematic diagram of networking according to the embodiment IV of the present invention. As shown in FIG. 8, two calls from A to Z need to be established. Bearer routes of the two calls are established according to the separation strategy, which mainly comprises the following processing.

Step (1): establish the first call. At this moment there is only one reachable path in the network, and the first call uses path L1→L2→L3 and passes through nodes A, B, C, and Z respectively.

Step (2): establish the second call, which comprises the following steps.

Step A: it is first considered to completely separate the path of the second call from that of the first call by using the complete separation strategy, bypassing links L1, L2, L3 and nodes B and C. And if no node and link resource meeting the condition are found, then the complete separation strategy is failed and step B is continued.

Step B: use the strategy of separating links and nodes as much as possible, bypassing links L1, L2, L3 and nodes B and C passed by the first call, and not bypassing SRLG. And if still no link and node resource meeting the condition are found, then the link and nodes separation strategy is still not met and step C is performed.

Step C: use the strategy of separating links as far as possible, bypassing links L1, L2, L3, and not bypassing nodes B, C and SRLG. And it is determined that there is still no link resource meeting the condition, then this strategy being not met and step D is continued.

Step D: under the condition that links, nodes and SRLG all cannot be bypassed, the second call has to use the path L1→L2→L3 which is the same as that of the first call and passes through nodes A, B, C and Z respectively.

By then, the establishment of two calls succeeds, and the procedure is ended. The route carrying the second call is completely overlapped with that carrying the first call.

The above four examples are only instances of the embodiments of the present invention, and other embodiments can also be comprised therein if there is no confliction. For example, when performing routes separation, nodes separation, links separation and shared risk link groups separation can be sorted with priority levels according to user demands, then be combined into a network resources minimum overlap strategy. The routes separation can be performed according to this strategy.

As described above, by virtue of the technical solution provided by the embodiments of the present invention, performing separation to the routes carrying each service in the automatic switching optical network (ASON) according to the network resource complete separation strategy or network resources minimum overlap strategy can solve the problem in relevant art that when the ASON control plane establishes multiple services, the routes carrying the services either are not separated or completely separated, which causes that the network resources cannot be sufficiently used or the routes carrying the services cannot be sufficiently separated since the resources are insufficient. The routes carrying different calls or different services under the same call can be maximally separated while the network resources also can be sufficiently used. Moreover, users can adjust the priority levels of node, link and SRLG separation according to practical needs and combines them into a separation strategy again, thus the user experience is effectively improved.

Apparently, those skilled in the art shall understand that the above-mentioned modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

The invention claimed is:

1. A method for routes separation in ASON services, comprising:
   calculating a route for each of different calls or each of different services of a same call in an automatic switched optical network (ASON);
   wherein when there are enough network resources, then set the routes of the respective services to be independent from each other; and when there are not enough resources, then set the routes of the respective services to be partially overlapped or completely overlapped.

2. The method according to claim 1, wherein the network resources comprise:
   node resources, link resources, and shared risk link group resources.

3. The method according to claim 2, wherein setting the routes of the respective services to be independent from each other comprises:
   completely separating the routes carrying each of the services in the ASON according to the strategy of links separation, nodes separation and shared risk link groups separation.

4. The method according to claim 3, wherein,
   performing the links separation by setting any two routes carrying services in the ASON not to comprise a same link;
   performing the nodes separation by setting any two routes carrying services in the ASON not to comprise a same intermediate node; and
   performing the shared risk link groups separation by setting any two routes carrying services in the ASON not to comprise links belonging to a same shared risk link group.

5. The method according to claim 2, wherein setting the routes of the respective services to be partially overlapped or completely overlapped comprises:
   Step B1: performing separation according to a strategy of links separation, nodes separation and shared risk link groups non-separation, judging whether the routes carrying the respective services can be determined, if not, then performing step B2;
   Step B2: performing separation according to a strategy of links separation, nodes non-separation and shared risk link groups non-separation, judging whether the routes carrying the respective services can be determined, if not, then performing step B3; and
   Step B3: performing separation according to a strategy of links non-separation, nodes non-separation and shared risk link groups non-separation, judging whether the routes carrying the respective services can be determined, wherein if not, then a route carrying the service cannot be established in the ASON.

6. The method according to claim 5, wherein,
   performing the links separation by setting any two routes carrying services in the ASON not to comprise a same link;
   performing the nodes separation by setting any two routes carrying services in the ASON not to comprise a same intermediate node; and
   performing the shared risk link groups separation by setting any two routes carrying services in the ASON not to comprise links belonging to a same shared risk link group.

7. An apparatus for routes separation in ASON services, comprising:
   a route calculating unit, configured to calculate a route for each of different calls or each of different services of a same call in an automatic switched optical network (ASON), wherein when there are enough network resources, then set the routes of the respective services to be independent from each other; and when there are not enough resources, then set the routes of the respective services to be partially overlapped or completely overlapped.

8. The apparatus according to claim 7, wherein the route calculating unit comprises:
- a first route separating module, configured to determine the routes carrying the respective services according to the strategy of links separation, nodes separation and shared risk link groups separation;
- a second route separating module, configured to determine the routes carrying the respective services according to the strategy of links separation, nodes separation and shared risk link groups non-separation;
- a third route separating module, configured to determine the routes carrying the respective services according to the strategy of links separation, nodes non-separation and shared risk link groups non-separation; and
- a fourth route separating module, configured to determine the routes carrying the respective services according to the strategy of links non-separation, nodes non-separation and shared risk link groups non-separation.

9. The apparatus according to claim 8, wherein,
- the route calculating unit is further configured to perform the links separation by setting any two routes carrying services in the ASON not to comprise a same link;
- the route calculating unit is further configured to perform the nodes separation by setting any two routes carrying services in the ASON not to comprise a same intermediate node; and
- the route calculating unit is further configured to perform the shared risk link groups separation by setting any two routes carrying services in the ASON not to comprise links belonging to a same shared risk link group.

* * * * *